United States Patent [19]

Sakashita et al.

[11] Patent Number: 5,606,009
[45] Date of Patent: Feb. 25, 1997

[54] COPOLYMERIZED POLYCARBONATES

[75] Inventors: Takeshi Sakashita; Tomoaki Shimoda, both of Iwakuni; Takashi Nagai, Otake, all of Japan

[73] Assignee: General Electric Company, Pittsfield, Mass.

[21] Appl. No.: 390,200

[22] Filed: Feb. 17, 1995

Related U.S. Application Data

[62] Division of Ser. No. 119,317, Sep. 9, 1993, Pat. No. 5,405,933, which is a continuation of Ser. No. 863,926, Apr. 6, 1992, abandoned.

[30] Foreign Application Priority Data

Apr. 9, 1991 [JP] Japan ..................... 3-76478
Feb. 21, 1992 [JP] Japan ..................... 4-35305

[51] Int. Cl.$^6$ .................... C08G 64/00; C08F 6/00
[52] U.S. Cl. ................. 528/204; 528/171; 528/174; 528/176; 528/196; 528/198; 528/199; 528/486; 528/487; 528/490; 528/494
[58] Field of Search ................... 528/204, 171, 528/174, 176, 196, 198, 199, 486, 487, 490, 494

[56] References Cited

U.S. PATENT DOCUMENTS

| | | | |
|---|---|---|---|
| 3,879,347 | 4/1975 | Serini et al. | 528/196 |
| 4,435,561 | 3/1984 | Lai et al. | 528/193 |
| 5,405,933 | 4/1995 | Sakashita et al. | 528/204 |

FOREIGN PATENT DOCUMENTS

| | | |
|---|---|---|
| 0971777 | 3/1959 | Germany. |
| 55-098224 | 7/1980 | Japan. |
| 55-131048 | 10/1980 | Japan. |
| 62-045623 | 2/1987 | Japan. |
| 219188 | 2/1968 | U.S.S.R.. |

OTHER PUBLICATIONS

Chemical Abstracts, vol. 64, No. 10, 9 May 1966, Columbus, Ohio, US: abstract No. 1429oh, E. Jaarv. 'Synthesis of resorcinol polycarbonates; abstract & Tr. Tallinsk. Poletekhn. Inst., Ser. A No. 215, 1964, pp. 71–77.

*Primary Examiner*—Terressa Mosley

[57] ABSTRACT

The present invention provides copolymerized copolyestercarbonates having improved flow and formability, in addition to excellent mechanical properties, heat resistance, transparency, and water resistance obtained by copolymerization of two or more aromatic dihydroxy compounds and a compound capable of reacting with those aromatic dihydroxy compounds to form carbonate linkages, characterized in that, of all the constituent repeating units derived from aromatic dihydroxy compounds, 2–40 mole % are derived from resorcin and/or substituted resorcins.

6 Claims, No Drawings

COPOLYMERIZED POLYCARBONATES

This is a divisional of application Ser. No. 08/119,317 filed on Sep. 9, 1993 now U.S. Pat. No. 5,405,933, which is a continuation of Ser. No. 07/863,926 filed on Apr. 6, 1992 which has been abandoned.

The present invention relates to copolymerized polycarbonates, specifically to copolymerized polycarbonates having improved formability and flow during forming, in addition to excellent mechanical properties, heat resistance, transparency, and water resistance.

Polycarbonates have excellent impact resistance and other mechanical properties as well as good heat resistance, transparency, etc. They are widely used in various types of machine parts, optical disks, automobile parts, etc.

Conventional polycarbonates having such properties are usually produced by interfacial polymerization, in which bisphenol A reacts directly with phosgene.

Polycarbonates of this type have high glass transition temperatures ($T_g$). When they are melt formed into optical disks, etc., their fluidity is increased by melting them at high temperatures.

Molded products of polymers in general, and polycarbonates in particular, are more prone to show effects such as impaired transparency and discoloration the longer the material remains in molten form at high temperatures during molding. Thus, if the fluidity of polycarbonates during melt forming could be improved, the length of time they are kept in a molten state could be shortened, thus giving molded products which are less affected by heat during forming. The forming characteristics of the polymers would also be improved in other respects, such as shorter molding cycle times and better productivity.

Thus there has been a demand for polycarbonates which show even better flow and formability without sacrificing the inherent advantages of polycarbonates such as their mechanical properties, heat resistance, and transparency.

As a result of determined research by the present inventors seeking to obtain polycarbonates with improved flow and formability without loss of mechanical properties, heat resistance, water resistance, or transparency, it has been found that copolymerized polycarbonates in which the constituent units formed from aromatic dihydroxy compounds contain a certain proportion of units formed from resorcin and/or substituted resorcins show just such excellent properties. That discovery has led to the present invention.

The present invention has been developed with the above-mentioned problems of the prior art in mind. Its object is to provide copolymerized polycarbonates having excellent mechanical properties, heat resistance, transparency, and water resistance, with improved flow and formability.

Copolymerized polycarbonates in accordance with the present invention are formed by copolymerization of two or more aromatic dihydroxy compounds, and a compound capable of reacting with aromatic dihydroxy compounds to form carbonate linkages, and are characterized in that 2–40 mole % of the constituent repeating units derived from aromatic dihydroxy compounds are derived from resorcin and/or substituted resorcins.

Copolymerized polycarbonates in accordance with the present invention contain constituent units derived from resorcin and/or substituted resorcins as a certain proportion of the constituent units derived from aromatic dihydroxy compounds. They not only show excellent mechanical properties, heat resistance, and transparency, but also good water resistance, and excellent melt flow and formability.

Copolymerized polycarbonates in accordance with the present invention are explained below.

Copolymerized polycarbonates in accordance with the present invention are obtained by copolymerization of two or more aromatic dihydroxy compounds with a compound capable of reacting with such dihydroxy compounds to form carbonate linkages. Among the constituent units derived from the aromatic dihydroxy compounds are constituent units derived from resorcin and/or substituted resorcins.

The constituent units derived from resorcin or substituted resorcins are represented by the following general formula I

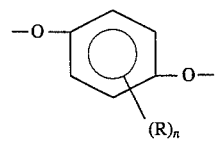

In this formula [I], each R is a $C_{1-10}$ hydrocarbyl group or halogenated hydrocarbyl group, or a halogen atom. n is an integer from 0 to 4. When n is 2 or more, the various R groups may be the same or different.

The resorcin or substituted resorcins referred to above may be resorcin, 3-methylresorcin, 3-ethylresorcin, 3-propylresorcin, 3-butylresorcin, 3-tert-butylresorcin, 3-phenylresorcin, 3-cumylresorcin, 2,3,4,5-tetrafluororesorcin, 2,3,4,5-tetrabromoresorcin, etc.

Of the various compounds of this type, resorcin is preferred.

Copolymerized polycarbonates in accordance with the present invention should comprise 2–40 mole %, preferably 2–30 mole %, more preferably 5–25 mole %, constituent units derived from resorcin or substituted resorcins, where the total of all constituent units derived from aromatic dihydroxy compounds is 100 mole %.

Such copolymerized polycarbonates containing 2–40 mole % constituent units derived from resorcin and/or substituted resorcins show improved flow and formability. If the proportion of constituent units from resorcin and/or substituted resorcins exceeds 40 mole %, however, the heat resistance, water resistance, and thermal stability of the material will tend to be impaired.

There is no particular restriction on the constituent units derived from aromatic dihydroxy compounds other than resorcin and/or substituted resorcins; they may be formed from any of the following aromatic dihydroxy compounds commonly used to make polycarbonates.

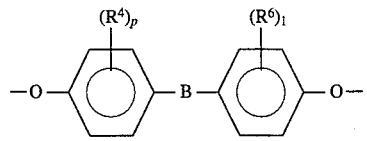

(where B is

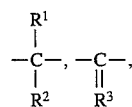

—O—, —S—, —SO— or —SO$_2$—, $R^1$ and $R^2$ are hydrogen atoms or monovalent hydrocarbyl groups, $R^3$ is a divalent hydrocarbylene group, and $R^4$ and $R^5$ are halogen atoms or monovalent hydrocarbyl groups, each of which may be the same as or different from the others, and p and q are both integers from 0 to 4).

Examples of such aromatic dihydroxy compounds include:

bis(4-hydroxyphenyl)methane,
1,1-bis(4-hydroxyphenyl)ethane,
2,2-bis(4-hydroxyphenyl)propane,
2,2-bis(4-hydroxyphenyl)butane,
2,2-bis(4-hydroxyphenyl)octane,
bis(4-hydroxyphenyl)phenylmethane,
2,2-bis(4-hydroxy-1-methylphenyl)propane,
1,1-bis(4-hydroxy-tert-butylphenyl)propane,
2,2-bis(4-hydroxy-3-bromophenyl)propane, and other bis(hydroxy aryl) alkanes,
1,1-bis(4-hydroxyphenyl)cyclopentane,
1,1-bis(4-hydroxyphenyl)cyclohexane, and other bis(hydroxy aryl) cycloalkanes,
4,4'-dihydroxydiphenyl ether,
4,4'-dihydroxy-3,3'-dimethyldiphenyl ether, and other dihydroxy aryl ethers,
4,4'-dihydroxydiphenyl sulfide,
4,4'-dihydroxy-3,3'-dimethyldiphenyl sulfide, and other dihydroxy diaryl sulfides,
4,4'-dihydroxydiphenyl sulfoxide,
4,4'-dihydroxy-3,3'-dimethyldiphenyl sulfoxide, and other dihydroxy diaryl sulfoxides, and
4,4'-dihydroxydiphenyl sulfone,
4,4'-dihydroxy-3,3'-dimethyldiphenyl sulfone, and other dihydroxy diaryl sulfones.

Of the various compounds of this type, 2,2-bis(4-hydroxyphenyl)propane is preferred.

In the production of copolymerized polycarbonates in accordance with the present invention, the compounds which react with these dihydroxy compounds to form carbonate linkages may be carbonate diesters, carbonyl halides, etc.

Specific examples include:
diphenyl carbonate,
ditolyl carbonate,
bis(chlorophenyl) carbonate,
m-cresyl carbonate
dinaphthyl carbonate,
bis(diphenyl) carbonate,
diethyl carbonate,
dimethyl carbonate,
dibutyl carbonate,
dicyclohexyl carbonate, and other carbonate diesters, phosgene, and other carbonyl halides.

Of the various compounds of this type, diphenyl carbonate is preferred.

Copolymerized polycarbonates in accordance with the present invention may also contain constituent repeating units derived from dicarboxylic acids, dicarboxylic acid esters, or dicarboxylic acid halides. Such constituent repeating units are polyester-polycarbonate units.

Specific examples of dicarboxylic acids include terephthalic acid, isophthalic acid, sebacic acid, decanedioic acid, dodecanedioic acid, etc.

Specific examples of dicarboxylic acid esters include diphenyl sebacate, diphenyl terephthalate, diphenyl isophthalate, diphenyl decanedioate, diphenyl dodecanedioate, etc.

Specific examples of dicarboxylic acid halides include terephthaloyl chloride, isophthaloyl chloride, sebacoyl chloride, decanedioyl chloride, dodecanedioyl chloride, etc.

Such polyester-polycarbonate units may be present in proportions of up to 50 mole %, preferably not more than 30 mole %, in copolymerized polycarbonates in accordance with the present invention.

Copolymerized polycarbonates in accordance with the present invention may also contain constituent units derived from polyfunctional compounds having three or more functional groups per molecule, so long as this does not interfere with the object of the invention. The amount of such constituent units present in the copolymerized polycarbonate is usually not more than 0.03 mole, preferably 0.001–0.02 mole, more preferably 0.001–0.01 mole.

The polyfunctional compounds are preferably compounds having three or more phenolic hydroxyl groups or carboxyl groups. It is particularly preferred to use compounds having three or more phenolic hydroxyl groups, such as:
1,1,1-tris(4-hydroxyphenyl)ethane,
2,2',2"-tris(4-hydroxyphenyl)diisopropylbenzene, α-methyl-α,α',α'-tris(4-hydroxyphenyl)-1,4-diethylbenzene,
α,α',α"-tris(4-hydroxyphenyl)-1,3,5-triisopropylbenzene,
fluoroglycin,
4,6-dimethyl-2,4,6-tri(4-hydroxyphenyl)heptane-2,1,3,5-tri(4-hydroxyphenyl)benzene,
2,2-bis[4,4-(4,4'-dihydroxyphenyl)cyclohexyl]propane, trimellitic acid,
1,3,5-benzenetricarboxylic acid, pyromellitic acid, etc.

Preferred among these compounds are 1,1,1-tris-(4-hydroxyphenyl)ethane, α,α',α"-tris(4-hydroxyphenyl)-1,3,5-triisopropylbenzene, etc.

Such copolymerized polycarbonates in accordance with the present invention generally have glass transition temperatures ($T_g$) of 100°–150° C., preferably 110°–135° C., and thermal decomposition temperatures of 350°–380° C., preferably 360°–380° C.

They usually have melt flow rates (MFR) (measured by the JIS K 7210 standard method, with temperature 300° C. and load 1.2 kg) of 5–100 g/10 min, preferably 8–50 g/10 min.

copolymerized polycarbonates in accordance with the present invention have excellent melt flow and formability in addition to good mechanical properties, heat resistance, transparency, color tone, and weather resistance.

Copolymerized polycarbonates in accordance with the present invention, containing a certain proportion of constituent units derived from resorcin or substituted resorcins such as those mentioned above, also show excellent stability during prolonged holdup in the molten state, as well as good water resistance.

Because such copolymerized polycarbonates can be formed using shorter melt processing times, they can be used to make copolymerized polycarbonate products with excellent properties which show little or no effects from the heat used in forming them, in addition to the advantages of shorter molding cycle times and better productivity.

Products formed from these copolymerized polycarbonates also show excellent color stability during prolonged use, and so they are well suited for use in optical applications such as sheets, lenses, compact disks, etc., automobile parts and other outdoor applications, as well as applications such as instrument housings, etc.

Copolymerized polycarbonates in accordance with the present invention not only have thermal decomposition temperatures as high as those of ordinary polycarbonates, but also show good chemical resistance, including to gasoline. They are thus suitable for molding into automobile engine parts.

As noted above, copolymerized polycarbonates in accordance with the present invention are produced using aromatic dihydroxy compounds including resorcin and/or substituted resorcins, and compounds which react with such aromatic dihydroxy compounds to form carbonate linkages. There is no particular restriction on the process used to make them. They can be produced by interfacial or solution polymerization using a carbonyl halide such as phosgene as the compound that reacts with the aromatic dihydroxy compounds to form carbonate linkages, or they may be produced using carbonate diesters by melt polymerization, solid-state polymerization, etc.

Of these various processes, melt polymerization is preferred. Some details of this process are described below.

Melt polycondensation processes are particularly preferred because some impairment of transparency or color tone may occur if aromatic dihydroxy compounds including resorcin and/or substituted resorcins are made to react directly with phosgene to form a copolymerized polycarbonate having constituent units derived from resorcin and/or substituted resorcins.

When copolymerized polycarbonates are produced by melt polymerization, aromatic dihydroxy compounds including resorcin and/or substituted resorcins are used along with carbonate diesters.

The resorcin and/or substituted resorcins used in the present invention are represented by the following general formula III

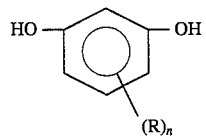

III

In this formula III, each R is a $C_{1-10}$ hydrocarbyl group or halogenated hydrocarbyl group, or a halogen atom. n is an integer from 0 to 4. When n is 2 or more, the various R groups may be the same or different.

Specific examples of these substituted resorcins include compounds such as those listed previously.

The resorcin and/or substituted resorcins used may be just one compound, or a combination of such compounds.

Of these various compounds, resorcin is preferably used.

The aromatic dihydroxy compounds used in the production of copolymerized polycarbonates in accordance with the present invention include 2–40 mole %, preferably 2–30 mole %, more preferably 5–25 mole %, resorcin and/or substituted resorcins.

The proportion of the aromatic dihydroxy compounds other than resorcin and/or substituted resorcins is 98–60 mole %, preferably 98–70 mole %, more preferably 95–75 mole %.

There is no particular restriction on the type of aromatic dihydroxy compounds other than resorcin and/or substituted resorcins, although compounds represented by the following general formula IV in which the phenyl rings are substituted with aliphatic groups or halogen atoms, are commonly used.

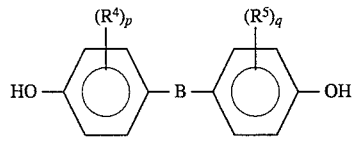

IV (where B is

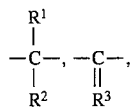

—O—, —S—, —SO— or —SO$_2$—, R$^1$ and R$^2$ are hydrogen atoms or monovalent hydrocarbyl groups, R$^3$ is a divalent hydrocarbylene group, and R$^4$ and R$^5$ are halogen atoms or monovalent hydrocarbyl groups, each of which may be the same as or different from the others, and p and q are both integers from 0 to 4).

Specific examples of such aromatic dihydroxy compounds include those listed previously.

Of those various compounds, 2,2-bis(4-hydroxyphenyl) propane is preferably used.

Specific examples of carbonate esters which can be used include those listed previously.

Of those, diphenyl carbonate is preferably used.

In accordance with the present invention, the carbonate diesters may also contain up to 50 mole %, preferably not more than 30 mole %, dicarboxylic acids, dicarboxylic acid esters, or dicarboxylic acid halides.

Specific examples of the dicarboxylic acids, dicarboxylic acid esters, or dicarboxylic acid halides which may be used include the compounds listed previously.

In the production of polycarbonates in accordance with the present invention, the amount of such carbonate diesters used should be 1.0–1.30 moles, preferably 1.01–1.20 moles, per mole of aromatic dihydroxy compounds.

It is also possible in the production of polycarbonates in accordance with the present invention to use polyfunctional compounds having three or more functional groups per molecule in addition to the aromatic dihydroxy compounds and carbonate diesters mentioned above.

Specific examples of the compounds which may be used include those listed previously.

When polyfunctional compounds are used, their amount is usually up to 0.03 mole, preferably 0.001–0.02 mole, more preferably 0.001–0.01 mole, per mole of aromatic dihydroxy compounds.

In accordance with the present invention, the aromatic dihydroxy compounds containing resorcin and/or substituted resorcins, and the carbonate diesters, are preferably made to undergo melt polycondensation in the presence of a catalyst comprising an alkali metal compound and/or an alkaline-earth metal compound (a).

Preferred examples of such an alkali metal compound and/or alkaline-earth metal compound (a) include salts of organic acids or inorganic acids, oxides, hydroxides, hydrides, alcoholates, etc.

Specifically, alkali metal compounds which may be used include sodium hydroxide, potassium hydroxide, lithium hydroxide, sodium hydrogen carbonate, potassium hydrogen carbonate, lithium hydrogen carbonate, sodium carbonate, potassium carbonate, lithium carbonate, sodium acetate, potassium acetate, lithium acetate, sodium stearate, potassium stearate, lithium stearate, sodium borohydride, lithium borohydride, sodium phenylborate, sodium benzoate, potassium benzoate, lithium benzoate, disodium hydrogen phosphate, dipotassium hydrogen phosphate, dilithium hydrogen phosphate, bisphenol A disodium salt, bisphenol A dipotassium salt, bisphenol A dilithium salt, sodium phenolate, potassium phenolate, lithium phenolate, etc.

Specific alkaline-earth metal salts which may be used include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate, etc.

These compounds may be used singly or in combinations.

The amount of alkali metal compound and/or alkaline-earth metal compound (a) used is generally $1 \times 10^{0-6}$ to $1 \times 10^{-3}$ mole, preferably $1 \times 10^{-7}$ to $1 \times 10^{-6}$ mole, more preferably $1 \times 10^{-7}$ to $2.5 \times 10^{-6}$ mole, per mole of aromatic dihydroxy compounds.

If the amount of alkali metal compound and/or alkaline-earth metal compound (a) used is $1 \times 10^{-0}$ to $1 \times 10^{-3}$ mole per mole of aromatic dihydroxy compounds, the basicity of those compounds can be weakened or completely neutralized by adding acidic compounds (described below) in amounts which serve to maintain high polymerization activity while not adversely affecting the properties of the resulting copolymerized polycarbonate. In this way one can obtain copolymerized polycarbonate having excellent color tone, heat resistance, water resistance, weather resistance, and stability when kept in a molten state for long periods of time.

The catalyst used in accordance with the present invention may be a combination of an alkali metal compound and/or alkaline-earth metal compound (a), as described above, with a basic compound (b), and/or a borate compound (c).

Examples of such a basic compound (b) include nitrogen compounds which are easily decomposed or volatilized at high temperatures. Specific compounds of this type include the following.

Alkyl, aryl, and/or alkaryl group-containing ammonium hydroxides, such as tetramethylammonium hydroxide ($Me_4NOH$), tetraethylammonium hydroxide ($Et_4NO$), tetrabutylammonium hydroxide ($Bu_4NOH$), trimethylbenzylammonium hydroxide ($\phi$-$CH_2(Me)_3NOH$), etc., tertiary amines, such as trimethylamine, triethylamine, dimethylbenzylamine, triphenylamine, etc., secondary amines represented by $R_2NH$ (where R is an alkyl group such as methyl, ethyl, etc., or an aryl group such as phenyl, tolyl, etc.), primary amines represented by $RNH_2$ (where R is as above), imidazoles, such as 2-methylimidazole, 2-phenylimidazole, etc., ammonia, or basic salts such as tetramethylammonium borohydride ($Me_4NBH_4$), tetrabutylammonium borohydride ($Bu_4NBH_4$), tetrabutylammonium tetraphenylborate ($Bu_4NBPh_4$), tetramethylammonium tetraphenylborate ($Me_4NBPh_4$), etc.

Of these various compounds, tetraalkyl ammonium hydroxides, in particular electronic-grade tetraalkyl ammonium hydroxides having low impurity metal contents, are preferably used.

Examples of borate compounds (c) include boric acid, and borate esters represented by the following general formula.

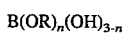

$$B(OR)_n(OH)_{3-n}$$

where R is a methyl, ethyl, or other alkyl group, phenyl or other aryl group, etc., and n is 1, 2, or 3.

Specific borate esters of this type include trimethyl borate, triethyl borate, tributyl borate, trihexyl borate, triheptyl borate, triphenyl borate, tritolyl borate, trinaphthyl borate, etc.

Preferred combinations for use as catalysts in accordance with the present invention include combinations of (a) an alkali metal compound and/or alkaline-earth metal compound, and (b) a nitrogen-containing basic compound.

The alkali metal compound and/or alkaline-earth metal compound (s) should be used in the amount specified above. The amount of the nitrogen-containing basic compound (b) should be $1 \times 10^{-6}$ to $1 \times 10{-1}$ mole, preferably $1 \times 10^{-6}$ to $1 \times 10^{-2}$ mole, per mole of aromatic dihydroxy compounds.

If the amount of nitrogen-containing basic compound (b) used is $1 \times 10^{-6}$ to $1 \times 10^{-1}$ mole per mole of aromatic dihydroxy compounds, the transesterification and polymerization reactions will proceed at adequate rates, and the resulting copolymerized polycarbonate will have excellent color tone, heat resistance, water resistance, etc.

The use of such a catalyst combination of an alkali metal compound and/or alkaline-earth metal compound (a) and a nitrogen-containing basic compound (b) makes it possible to produce high-molecular-weight copolymerized polycarbonates having excellent transparency, heat resistance, and water resistance, and improved color tone, at high polymerization activities.

In accordance with the present invention it is preferable to use a catalyst combination of (a) an alkali metal compound and/or alkaline-earth metal compound, and (c) boric acid or a borate ester, or a catalyst combination of (a) an alkali metal compound and/or alkaline-earth metal compound, (b) a nitrogen-containing basic compound, and (c) boric acid or a borate ester.

In such a catalyst combination, the alkali metal compound and/or alkaline-earth metal compound (a), and the nitrogen-containing basic compound (b), are preferably used in the amounts specified above.

The amount of boric acid or borate ester (c) used should be $1 \times 10^{-6}$ to $1 \times 10^{-1}$ mole,, preferably $1 \times 10^{-7}$ to $1 \times 10^{-2}$ mole, more preferably $1 \times 10^{-6}$ to $1 \times 10^{-4}$ mole, per mole of aromatic dihydroxy compounds.

If the amount of boric acid or borate ester (c) used is $1 \times 10^{-0}$ to $1 \times 10^{-1}$ mole per mole of aromatic dihydroxy compounds, one can obtain a copolymerized polycarbonate which does not tend to lose molecular weight after heat aging, and shows excellent color tone, heat resistance, and water resistance.

In particular, the use of catalysts comprising (a) alkali metal compounds and/or alkaline-earth metal compounds, (b) nitrogen-containing basic compounds, and (c) boric acid or borate esters, makes it possible to produce high-molecular-weight copolymerized polycarbonates having excellent transparency, heat resistance, and water resistance, and improved color tone, at high polymerization activities.

Using this sort of catalyst, the polycondensation reaction of carbonate diesters with aromatic dihydroxy compounds including resorcin and/or substituted resorcins can be carried out under conditions similar to those used in known polycondensation reactions of carbonate diesters with aromatic dihydroxy compounds.

Specifically, the aromatic dihydroxy compounds react with the carbonate diesters at atmospheric pressure and a temperature of 80°–250° C. preferably 100°–230° C., more preferably 120°–190° C., 0 to 5 hours, preferably 0 to 4 hours, more preferably 0 to 3 hours, after which the pressure in the reaction system is lowered and the temperature increased as the reaction between aromatic dihydroxy compounds and carbonate diesters proceeds, eventually reaching a pressure of less than 5 mm Hg, preferably less than 1 mm Hg, and a temperature of 240°–320° C., cause polycondensation of the aromatic dihydroxy compounds with the carbonate diesters.

This polycondensation may be carried out continously or batchwise, in a tank, tubular, or column reactor.

The copolymerized polycarbonate thus obtained generally has an intrinsic viscosity [η] of 0.2–1.2 dL/g, preferably 0.3–1.0 dL/g.

In accordance with the present invention, it is preferred to add an acidic compound and optionally an epoxy compound to the reaction product, i.e. the copolymerized polycarbonate, thus obtained.

The acidic compound may be a Lewis acid, a Broensted acid, or an ester of a sulfur-containing strong acid, so long as it is capable of neutralizing the alkaline compound (alkali metal compound, alkaline-earth metal compound, etc.) used as the catalyst.

A Broensted acid used for this purpose should have a $pK_a$ of less than 5, preferably less than 3, in aqueous solution at 25° C.

Using an acidic compound having such a $pK_a$ value is advantageous because it can neutralize the alkali metal or alkaline-earth metal used as the catalyst, and thus stabilize the resulting copolymerized polycarbonate.

Specific examples of Lewis acids include:

boron compounds, such as zinc borate, boron phosphate, etc., borate esters, such as $B(OCH_3)_3$, $B(OEt)_3$, $B(OPh)_3$, etc., aluminum compounds, such as aluminum stearate, aluminum silicate, etc., zirconium compounds, such as zirconium carbonate, zirconium alkoxides, zirconium hydroxycarboxylates, etc., gallium compounds, such as gallium phosphide, gallium antimonide, etc., germanium compounds, such as germanium oxide, organic germanium, etc., tin compounds such as tetra- and hexaorganotin compounds, $PhOSn(Bu)_2OSn(Bu)_2OPh$, etc., antimony compounds, such as antimony oxide, alkyl antimony compounds, etc., bismuth compounds, such as bismuth oxide, alkyl bismuth compounds, etc., zinc compounds, such as $(CH_3COO)_2Zn$, zinc stearate, etc., and titanium compounds, such as alkoxy titanium compounds, titanium oxide, etc.

(In the formulas above, Ph represents a phenyl group, Et an ethyl group, and Bu a butyl group.)

Specific examples of Broensted acids include:

phosphoric acid, phosphorous acid, hypophosphorous acid, pyrophosphoric acid, polyphosphoric acid, boric acid, hydrochloric acid, hydrobromic acid, sulfuric acid, sulfurous acid, adipic acid, azelaic acid, dodecanoic acid, L-ascorbic acid, asparaginic acid, benzoic acid, formic acid, acetic acid, citric acid, glutamic acid, salicylic acid, nicotinic acid, fumaric acid, maleic acid, oxalic acid, benzenesulfinic acid, toluenesulfinic acid, benzenesulfonic acid, p-toluenesulfonic acid, p-toluenesulfonic acid, trifluoromethanesulfonic acid, naphthalene-sulfonic acid, sulfonated polystyrene, methyl acrylate-sulfonated styrene copolymers, other sulfonic acids, etc.

Esters of sulfur-containing acids which may be used include dimethyl sulfate, diethyl sulfate, methyl, ethyl, butyl, octyl, or phenyl esters of p-toluenesulfonic acid, methyl, ethyl, butyl, or octyl esters of benzenesulfonic acid, and other such compounds whose acid groups have a $pK_a$ of less than 3.

Of these various acidic compounds, those containing sulfur, phosphorus, etc. are preferred. Acidic compounds containing sulfur are particularly preferred.

The acidic compounds are added to the reaction product in amounts sufficient to neutralize or weaken the effect of residual alkaline compounds on the copolymerized polycarbonate. The amount could be, for example, 0.01–500 moles, preferably 0.1–100 moles, more preferably 0.1–50 moles, most preferably 0.5–30 moles, per mole of residual alkali metal compound and/or alkaline-earth metal compound in the copolymerized polycarbonate.

In particular when the acidic compound is a Lewis acid or a Broensted acid with a $pK_a$ greater than 3, the amount used should be 0.01–500 moles, preferably 0.1–50 moles, more preferably 0.1–30 moles. If the acidic compound is a Broensted acid with a $pK_a$ of 3 or less, or an ester of a sulfur-containing acid, the amount used should be 0.01–500 moles, preferably 0.1–15 moles, more preferably 0.1–7 moles.

Epoxy compounds which may be used in accordance with the present invention are compounds having one or more epoxy groups per molecule. There is no particular restriction on the amount used, although it is generally 0.0001–0.2 wt. part, preferably 0.001–0.1 wt. part, per 100 wt. parts of copolymerized polycarbonate in the reaction product.

Specific examples of such epoxy compounds include epoxidized soybean oil, epoxidized linseed oil, phenyl glycidyl ether, allyl glycidyl ether, tert-butylphenyl glycidyl ether, 3,4-epoxycyclohexylmethyl 3,4-epoxycyclohexanecarboxylate, 3,4-epoxy-6-methylcyclohexylmethyl 3,4-epoxy-6-methylcyclohexanecarboxylate, 2,3-epoxycyclohexylmethyl 3,4-epoxycyclohexanecarboxylate, 4-(3,4-epoxy-5-methylcyclohexyl)butyl 3,4-epoxycyclohexanecarboxylate, 3,4-epoxycyclohexylethylene oxide, cyclohexylmethyl 3,4-epoxycyclohexanecarboxylate, 3,4-epoxy-6-methylcyclohexylmethyl 6-methylcyclohexanecarboxylate, bisphenol A diglycidyl ether, tetrabromobisphenol A glycidyl ether, phthalic acid diglycidyl ester, hexahydrophthalic acid diglycidyl ester, bis-epoxycyclopentadienyl ether, bis-epoxyethylene glycol, bis-epoxycyclohexyl adipate, butadiene diepoxide, tetraphenylethylene epoxide, octyl epoxytalate [sic], epoxidized polybutadiene, 3,4-dimethyl-1,2-epoxycyclohexane, 3,5-dimethyl-1,2-epoxycyclohexane, 3-methyl-5-tert-butyl-1,2-epoxycyclohexane, octadecyl 2,2-dimethyl-3,4-epoxycyclohexanecarboxylate, n-butyl 2,2-dimethyl-3,4-epoxycyclohexanecarboxylate, cyclohexyl 2-methyl-3,4-epoxycyclohexanecarboxylate, n-butyl 2-isopropyl-3,4-epoxy-5-methylcyclohexanecarboxylate, octadecyl 3,4-epoxycyclohexanecarboxylate, 2-ethylhexyl 3',4'-epoxycyclohexanecarboxylate, 4,6-dimethyl-2,3-epoxycyclohexyl 3',4'-epoxycyclohexanecarboxylate, 4,5-epoxytetrahydrophthalic anhydride, 3-tert-butyl-4,5-epoxytetrahydrophthalic anhydride, diethyl 4,5-epoxy-cis-1,2-cyclohexanedicarboxylate, di-n-butyl-3-tert-butyl 4,5-epoxy-cis-1,2-cyclohexanedicarboxylate, etc. These compounds may be used singly or in combinations of two or more.

When acidic and epoxy compounds are added at the same time to the copolymerized polycarbonate reaction product, any excess acidic compound reacts with the epoxy compound and is neutralized, and one thus obtains a copolymerized polycarbonate having excellent color tone, heat resistance, water resistance, etc.

In the method of producing copolymerized polycarbonates in accordance with the present invention, there is no particular restriction on the technique used to add the acidic compound and optionally an epoxy compound to the polycarbonate obtained as the reaction product. For example, the acidic compound and optionally an epoxy compound may be added to the copolymerized polycarbonate in the molten state and kneaded with it, or the acidic compound and optionally an epoxy compound may be added to a solution of the copolymerized polycarbonate and stirred.

Once the polycondensation reaction is complete, the acidic and epoxy compounds may be added to the molten copolymerized polycarbonate reaction product simultaneously or one after the other, either in the reactor or in an extruder, and then kneaded. It is also possible to pelletize the copolymerized polycarbonate, and then feed the acidic compound and optionally an epoxy compound along with the pellets to a single-screw or twin-screw extruder to melt knead them with the polymer. Another method is to dissolve the copolymerized polycarbonate in a suitable solvent, such as methylene chloride, chloroform, toluene, tetrahydrofuran, etc., to prepare a solution, and then add the acidic compound and optionally an epoxy compound to the solution either simultaneously or one after the other, and stir.

When an acidic compound and an epoxy compound are added separately to the copolymerized polycarbonate, either the acidic compound or the epoxy compound may be added first.

In addition to such acidic compounds and epoxy compounds, it is also possible in accordance with the present invention to add the usual heat stabilizers, Tinuvin ultraviolet absorbers, mold release agents, antistatic agents, slip agents, antiblocking agents, lubricants, antifogging agents, dyes, pigments, natural oils, synthetic oils, waxes, organic fillers, inorganic fillers, etc. to the copolymerized polycarbonate in amounts which do not interfere with the object of the present invention.

Specific examples of such heat stabilizers include phenolic stabilizers, organic thio ether stabilizers, organic phosphite stabilizers, hindered amine stabilizers, and epoxy stabilizers.

Phenolic stabilizers include, for example, n-octadecyl 3-(4-hydroxy-3',5'-di-tert-butylphenyl)propionate, Tetrakis[methylene-3-(3',5'-di-tert-butyl-4-hydroxyphenyl)propionato]methane, 1,1,3-tris(2-methyl-4-hydroxy-5-tert-butylphenyl)butane, distearyl (4-hydroxy-3-methyl-5-tert-butyl)benzylmalonate, 4-hydroxymethyl-2,6-di-tert-butylphenol, etc. These may be used singly or in combinations of two or more.

Thio ether stabilizers include, for example, dilauryl thiodipropionate, distearyl thiodipropionate, dimyristyl 3,3'-thiodipropionate, ditridecyl 3,3'-thiodipropionate, pentaerythritol tetrakis(β-laurylthiopropionate), etc. These may be used singly or in combinations of two or more.

Phosphorus-containing stabilizers include, for example:

aryl alkyl phosphites such as bis(2,4-di-tert-butylphenyl) pentaerythrityl diphosphite, diphenyl decyl phosphite, diphenyl isooctyl phosphite, phenyl isooctyl phosphite, 2-ethylhexyl diphenyl phosphite, etc., trialkyl phosphites such as trimethyl phosphite, triethyl phosphite, tributyl phosphite, trioctyl phosphite, trinonyl phosphite, tridecyl phosphite, trioctadecyl phosphite, distearyl pentaerythrityl diphosphite, tris(2-chloroethyl) phosphite, tris(2,3-dichloropropyl) phosphite, etc., tricycloalkyl phosphites such as tricyclohexyl phosphite, etc., triaryl phosphites such as triphenyl phosphite, tricresyl phosphite, tris(ethylphenyl) phosphite, tris-(2,4-di-tert-butylphenyl) phosphite, tris(nonylphenyl) phosphite, tris(hydroxyphenyl) phosphite, etc., trialkyl phosphates such as trimethyl phosphate, triethyl phosphate, tributyl phosphate, trioctyl phosphate, tridecyl phosphate, trioctadecyl phosphate, distearyl pentaerythrityl diphosphate, tris(2-chloroethyl) phosphate, tris(2,3-dichloropropyl) phosphate, etc., tricycloalkyl phosphates such as tricyclohexyl phosphate, etc., and triaryl phosphates such as triphenyl phosphate, tricresyl phosphate, tris(nonylphenyl) phosphate, 2-ethylphenyl diphenyl phosphate, etc. These may be used singly or in combinations of two or more.

Hindered amine stabilizers include, for example, bis(2,2,6,6-tetramethyl-4-piperidinyl) sebacate, bis(1,2,2,6,6-pentamethyl-4-piperidinyl) sebacate, 1-[2-{3-(3,5-di-tert-butyl-4-hydroxyphenyl)propionyloxy}ethyl]-4-{3-(3,5-di-tert-butyl-4-hydroxyphenyl)-propionyloxy}-2,2,6,6-tetramethylpiperidine, 8-benzyl-7,7,9,9-tetramethyl-3-octyl-1,2,3-triazaspiro[4,8]undecan-2,4-dione, 4-benzoyloxy-2,2,6,6-tetramethylpiperidine, bis(1,2,2,6,6-pentamethyl-4-piperidinyl) 2-(3,5-di-tert-butyl-4-hydroxybenzyl)-2-n-butylmalonate, tetrakis(2,2,6,6-tetramethyl-4-piperidinyl) 1,2,3,4-butanetetracarboxylate, etc. These may be used singly or in combinations of two or more.

The amount of such heat stabilizers used should generally be 0.001–5 wt. parts, preferably 0.005–0.5 wt. part, more preferably 0.01–0.3 wt. part, per 100 wt. parts of the copolymerized polycarbonate.

These heat stabilizers may be added either in solid or liquid form.

In order to reduce the number of times the copolymerized polycarbonate has to be reheated, these heat stabilizers are preferably added while the copolymerized polycarbonate is still in molten form, anywhere from the final polymerization reactor to the point at which the product is cooled and pelletized. Because the copolymerized polycarbonate contains heat stabilizers, thermal decomposition of the polymer will be inhibited during subsequent reheating and processing, such as extrusion or pelletizing operations.

One can also add ultraviolet absorbers at the same time as the heat stabilizers. There is no particular restriction on the type of ultraviolet absorber used. It may be any of the common ultraviolet absorbers, such as a salicylate ultraviolet absorber, a benzophenone ultraviolet absorber, a benzotriazole ultraviolet absorber, a cyanoacrylate ultraviolet absorber, etc.

Specific examples of salicylate ultraviolet absorbers include phenyl salicylate, p-tert-butylphenyl salicylate, etc.

Benzophenone ultraviolet absorbers include 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-carboxybenzophenone, 2-hydroxy-4-methoxy-5-sulfobenzophenone trihydrate, 2-hydroxy-4-n-octoxybenzophenone, 2,2',4,4'-tetrahydroxybenzophenone, 4-dodecyloxy-2-hydroxybenzophenone, bis(5-benzoyl-4-hydroxy-2-methoxyphenyl)methane, 2-hydroxy-4-methoxybenzophenone-5-sulfonic acid, etc.

Examples of benzotriazole ultraviolet absorbers include 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-5'-tert-octylphenyl)benzotriazole, 2-(2'- hydroxy-3',5'-di-tert-amylphenyl)benzotriazole, 2-[2'-hydroxy-3'-(3',4',5',6'-tetrahydrophthalimidomethyl)-5'-methylphenyl]benzotriazole, 2,2'-methylenebis[4-(1,1,3,3-tetramethylbutyl)-6-(2H-benzotriazol-2-yl)phenol], etc.

Cyanoacrylate ultraviolet absorbers include 2-ethylhexyl 2-cyano-3,3-diphenylacrylate, ethyl 2-cyano- 3,3-diphenylacrylate, etc. They may be used singly or in combinations of two or more.

The amount of ultraviolet absorbers used is ordinarily 0.001–5 wt. parts, preferably 0.005–1 wt. part, more preferably 0.01–0.5 wt. part, per 100 wt. parts of the copolymerized polycarbonate.

In accordance with the present invention, mold release agents may also be added at the same time as the heat stabilizers described above. There is no particular restriction on the type of mold release agent used; it may be any of the common mold release agents. Examples include:

hydrocarbon mold release agents, such as natural and synthetic paraffins, polyethylene waxes, fluorocarbons, etc., fatty acid mold release agents, such as stearic acid, hydroxystearic acid, other higher fatty acids, hydroxy fatty acids, etc., fatty amide mold release agents, such as stearamide, ethylenebisstearamide, other alkylene bis fatty amides, etc., alcohol mold release agents, such as stearyl alcohol, cetyl alcohol, other fatty alcohols, polyhydric alcohols, polyglycols, polyglycerols, etc.

fatty acid ester mold release agents, such as butyl stearate, pentaerythritol tetrastearate, other fatty acid esters of lower alcohols, fatty acid esters of polyhydric alcohols, fatty acid esters of polyglycols, etc., and silicone mold release agents, such as silicone oils, etc.

These agents may be used singly or in combinations of two or more. The amount of mold release agent used is ordinarily 0.001–5 wt. parts, preferably 0.005–1 wt. part, more preferably 0.01–0.5 wt. part, per 100 wt. parts of the polycarbonate.

Colorants can also be added at the same time as the heat stabilizers discussed above. The colorants may be either pigments or dyes. Inorganic or organic colorants, or combinations of both types, can be used.

Specific examples of inorganic colorants include oxides such as titanium dioxide and iron oxide red, hydroxides such as alumina white, sulfides such as zinc sulfide, selenides, ferrocyanides such as Prussian Blue, chromate salts such as zinc chromate and Molybden Red, sulfate salts such as barium sulfate, carbonate salts such as calcium carbonate, silicate salts such as ultramarine, phosphate salts such as Manganese Violet, carbon in forms such as carbon black, metal powder pigments such as bronze powder and aluminum powder, etc.

Specific examples of organic colorants include nitroso compounds such as Naphthol Green B, nitro compounds such as Naphthol Yellow S, azo compounds such as Resol Red, Bordeaux 10B, Naphthol Red, and Cromophthal Yellow, phthalocyanine compounds such as Phthalocyanine Blue and Fast Sky Blue, and condensed polycyclic colorants such as Indanthrone Blue, Quinacridone Violet, and Dioxazine Violet, etc.

These colorants may be used singly or in combinations of two or more.

The amount of such colorants used is ordinarily $1\times10^{-6}$ to 5 wt. parts, preferably $1\times10^{-6}$ to 3 wt. parts, more preferably $1\times10^{-6}$ to 1 wt. part, per 100 wt. parts of the copolymerized polycarbonate.

In accordance with the present invention, the copolymerized polycarbonate obtained by the polycondensation reaction is preferably subjected to a vacuum treatment following the addition of the acidic compound and optionally an epoxy compound.

There is no particular restriction on the apparatus used for such vacuum treatment. For example, one may use a reactor having a vacuum apparatus attached to it, or an extruder with a vacuum apparatus attached.

When a reactor is used, it may be a vertical tank reactor or a horizontal tank reactor, although horizontal tank reactors are preferred.

Vacuum treatment in such a reactor is performed at a pressure of 0.05–750 mm Hg, preferably 0.05–5 mm Hg.

If vacuum treatment is carried out using an extruder, it is preferably performed for a period of approximately 10 seconds to 15 minutes. In a reactor, on the other hand, the treatment time is preferably from about 5 minutes to 3 hours. Vacuum treatment is preferably performed at a temperature of approximately 240°–350° C.

When vacuum treatment is carried out using an extruder, either a vented single-screw extruder or a vented twin-screw extruder may be used. The polymer can also be pelletized at the same time.

When vacuum treatment is carried out in an extruder, it can be performed at a pressure of 1–750 mm Hg, preferably 5–700 mm Hg.

Thus, by adding an acidic compound and optionally an epoxy compound to the copolymerized polycarbonate reaction product, then performing vacuum treatment, one can obtain a copolymerized polycarbonate having lower residual monomer and oligomer contents.

Copolymerized polycarbonates obtained as described above contain a random distribution of constituent units derived from the resorcin and/or substituted resorcins and carbonate diesters, and constituent units derived from the other aromatic dihydroxy compounds and the carbonate diesters.

Copolymerized polycarbonates in accordance with the present invention contain constituent units derived from resorcin and/or substituted resorcins as a certain proportion of all the constituent units formed from aromatic dihydroxy compounds. Copolymerized polycarbonates of this type have improved flow and formability in addition to excellent mechanical properties, heat resistance, transparency, and water resistance.

The present invention will now be explained by means of some examples, although it is by no means limited to the examples described here.

The following test methods were used for property measurements:

| | |
|---|---|
| Intrinsic Viscosity (IV) [dL/g]: | measured with an Uberode viscometer, in methylene chloride solution at 20° C. |
| Melt Flow Rate (MFR) [g/10 min]: | measured by the JIS K-7210 standard method, at 300° C. with a load of 1.2 kg |
| Color Tone (YI): | Test plates 3 mm thick were formed by injection molding at cylinder temperature 290° C., injection pressure 1000 kg/cm$^2$, cycle time 45 sec, and mold temperature 100° C. The X, Y and Z values for each plate were measured by the transmission method using a Color and Color Difference Meter ND-1001 DP (from Nippon Denshoku Kogyo). The yellowness index (YI) was obtained from the measured |

| | |
|---|---|
| Light Transmission: | values as follows.<br>YI = 100 (1.277X − 1.060Z)/Y<br>measured by the ASTM D 1003 standard method, using the same injection-molded test plates as in the color tone measurements |
| Haze: | measured with an NDH-200 meter (from Nippon Denshoku Kogyo) using the same injection-molded test plates as in the color tone measurements |
| Holdup Stability: | The resin was injection molded after being held up in the molding machine at a cylinder temperature of 320° C. for 15 minutes, and the YI and MFR of the resulting test plates were measured. |

EXAMPLE 1

A charge of 0.450 mole of bisphenol A (from Nihon GE Plastics Ltd.), 0.150 mole of resorcin (from Mitsui Sekiyu Kagaku Kogyo Ltd.), and 0.672 mole diphenyl carbonate (from Enii Co.) was placed in a 500-mL glass reactor, blanketed with nitrogen, and heated to 180° C. with stirring by a nickel agitator for 30 minutes. Then 91.2 mg of a 15% aqueous solution of tetramethyl-ammonium hydroxide ($2.5 \times 10^{-4}$ mole/mole bisphenol A) and 19.2 mg of a 0.1% aqueous solution of sodium hydroxide ($0.004 \times 2.5 \times 10^{-4}$ mole/mole bisphenol A) were added, and the contents stirred for 30 minutes to effect transesterification.

Then the temperature in the reactor was raised to 210° C. as the pressure was gradually lowered to 200 mm Hg and held at that value for 1 hour, after which the temperature was raised to 240° C. (still at 200 mm Hg) for 20 minutes, then the pressure was gradually lowered to 150 mm Hg and held for 20 minutes, then lowered to 150 mm Hg for 20 minutes, 100 mm Hg for 20 minutes, and 15 mm Hg for 0.5 hour, after which the temperature was raised to 270° C. and the pressure lowered to 0.5 mm Hg and the reaction allowed to continue for 2 hours.

After 2 hours the reactor was again blanketed with nitrogen, 5.472 mg of a 5% toluene solution of butyl p-toluenesulfonate ($0.008 \times 2.5 \times 10^{-4}$ mole/mole bisphenol A) was added, and the reactor contents were stirred for 30 minutes at 0.5 mm Hg, then formed into pellets.

The resulting copolymerized polycarbonate had an intrinsic viscosity (IV) of 0.49 dL/g.

The results are listed in Table 1.

EXAMPLES 2–5

The procedure in Example 1 was repeated using the amounts of bisphenol A and resorcin shown in Table 1, and kneading the reaction product after polymerization with the compounds shown in Table 1, to obtain copolymerized polycarbonates.

The results are listed in Table 1.

Comparison 1

The procedure in Example 1 was repeated using 0.600 mole of bisphenol A (from Nihon GE Plastics Ltd.) and no resorcin, to obtain a polycarbonate.

The results are shown in Table 1.

Comparison 2

The procedure in Comparison 1 was repeated using the type and amount of heat stabilizer listed in Table 1, to obtain a polycarbonate.

The results are listed in Table 1.

Comparison 3

The properties of bisphenol A polycarbonate (Lexan LS2-111, from Nihon GE Plastics Ltd.) are listed in Table 1.

Comparisons 4–5

The procedure in Example 1 was repeated, using 0.300 mole of bisphenol A (from Nihon GE Plastics Ltd.) and 0.300 mole of resorcin (from Mitsui Sekiyu Kagaku Kogyo Ltd.), to obtain copolymerized polycarbonates.

The results are listed in Table 1.

Comparison 6

The procedure in Example 1 was repeated, using 0.300 mole of bisphenol A (from Nihon GE Plastics Ltd.), 0.300 mole of resorcin (from Mitsui Sekiyu Kagaku Kogyo Ltd.), and 3.0 mg of a 3% aqueous solution of boric acid ($0.1 \times 2.5 \times 10^{-4}$ mole/mole bisphenol A) to obtain a copolymerized polycarbonate. The intrinsic viscosity (IV) of the polymer was 0.48 dL/g. The results are listed in Table 1.

TABLE 1

| | Example 1 | Example 2 | Example 3 | Example 4 | Example 5 |
|---|---|---|---|---|---|
| Bisphenol A/Resorcin (mole ratio in feed) | 75/25 | 75/25 | 85/15 | 90/10 | 85/15 |
| Acidic Compound Added | Butyl p-toluene-sulfonate | Butyl p-toluene-sulfonate | Butyl p-toluene-sulfonate | Butyl p-toluene-sulfonate | Butyl p-toluene-sulfonate |
| (moles/mole alkali metal) | 2 | 2 | 2 | 2 | 2 |
| Epoxy Compound Celloxide 2021P (Daicel) (g/100 g polymer) | 0 | 0,05 | 0 | 0 | 0.05 |
| Additives (g/100 g polymer) | | | | | |
| Irganox 168 (Ciba-Geigy) | 0 | 0.05 | 0 | 0 | 0.05 |
| Mark AO-50 (Adeka-Argus) | 0 | 0.05 | 0 | 0 | 0.05 |
| Cyasorb UV-5411 (Sun Chem) | 0 | 0.3 | 0 | 0 | 0.3 |
| TSF 437 (Toshiba Silicone) | 0 | 0.3 | 0 | 0 | 0.3 |
| Plast Violet 8840 (Bayer) | 0 | 0.00006 | 0 | 0 | 0.00006 |
| Initial Properties | | | | | |

TABLE 1-continued

|  | | | | | |
|---|---|---|---|---|---|
| Intrinsic Viscosity (dL/g) | 0.49 | 0.49 | 0.49 | 0.49 | 0.49 |
| MFR (g/10 min) | 15 | 16 | 13 | 12 | 14 |
| Color Tone (YI) | 2.0 | 0.6 | 1.9 | 1.8 | 0.6 |
| Light Transmission (%) | 90.8 | 89.6 | 90.8 | 90.8 | 89.7 |
| Haze | 0.3 | 0.3 | 0.4 | 0.3 | 0.3 |
| Holdup Stability | | | | | |
| MFR (g/10 min) | 17 | 18 | 14 | 13 | 15 |
| MFR Increase (%) | 10 | 15 | 10 | 10 | 10 |
| Color Tone (YI) | 2.3 | 0.9 | 2.2 | 2.2 | 0.9 |
| Light Transmission (%) | 90.7 | 89.6 | 90.7 | 90.7 | 90.1 |
| Heat Resistance HDT (°C.) | 123 | 123 | 130 | 131 | 130 |
| Heat Aging Resistance Color Tone (YI) | 37 | 13 | 36 | 35 | 12 |
| Water Resistance Haze | 2 | 4 | 1 | 1 | 4 |

|  | Comp. 1 | Comp. 2 | Comp. 3 | Comp. 4 | Comp. 5 | Comp. 6 |
|---|---|---|---|---|---|---|
| Bisphenol A/Resorcin (mole ratio in feed) | 100/0 | 100/0 | Lexan LS2 | 50/50 | 50/50 | 50/50 |
| Acidic Compound Added | Butyl p-toluene-sulfonate | Butyl p-toluene-sulfonate | — | Butyl p-toluene-sulfonate | Butyl p-toluene-sulfonate | — |
| (moles/mole alkali metal) | 2 | 2 | — | 2 | 2 | — |
| Epoxy Compound Celloxide 2021P (Daicel) (g/100 g polymer) | 0 | 0.05 | — | 0 | 0.05 | 0 |
| Additives (g/100 g polymer) | | | | | | |
| Irganox 168 (Ciba-Geigy) | 0 | 0.05 | — | 0 | 0.05 | 0 |
| Mark AO-50 (Adeka-Argus) | 0 | 0.05 | — | 0 | 0.05 | 0 |
| Cyasorb UV-5411 (Sun Chem) | 0 | 0.3 | — | 0 | 0.3 | 0 |
| TSF 437 (Toshiba Silicone) | 0 | 0.3 | — | 0 | 0.3 | 0 |
| Plast Violet 8840 (Bayer) | 0 | 0.00006 | — | 0 | 0.00006 | 0 |
| Initial Properties | | | | | | |
| Intrinsic Viscosity (dL/g) | 0.49 | 0.49 | 0.49 | 0.49 | 0.49 | 0.48 |
| MFR (g/10 min) | 10 | 11 | 11 | 20 | 21 | 21 |
| Color Tone (YI) | 1.8 | 0.6 | 0.5 | 2.1 | 0.7 | 2.0 |
| Light Transmission (%) | 90.8 | 89.7 | 89.6 | 90.8 | 89.6 | 90.6 |
| Haze | 0.3 | 0.3 | 0.4 | 0.4 | 0.4 | 0.4 |
| Holdup Stability | | | | | | |
| MFR (g/10 min) | 11 | 13 | 17 | 23 | 25 | 25 |
| MFR Increase (%) | 5 | 15 | 55 | 15 | 20 | 20 |
| Color Tone (YI) | 2.2 | 0.9 | 1.1 | 2.4 | 1.0 | 2.4 |
| Light Transmission (%) | 90.4 | 90.3 | 90.3 | 90.7 | 89.6 | 90.4 |
| Heat Resistance HDT (°C.) | 135 | 135 | 135 | 111 | 111 | 110 |
| Heat Aging Resistance Color Tone (YI) | 35 | 11 | 27 | 44 | 28 | 52 |
| Water Resistance Haze | 0.8 | 4 | 70 | 51 | 61 | 54 |

EXAMPLES 6–7

The procedure in Example 1 was repeated using the amounts of bisphenol A and resorcin listed in Table 2 with a total polymerization time of 1.5 hours, then the compounds listed in Table 2 were added in the amounts shown, and kneaded with the copolymerized polycarbonate, which was then formed into pellets.

The polycarbonates had intrinsic viscosities (IV) of 0.42 dL/g. The results are listed in Table 2.

Comparison 7

The procedure in Example 1 was repeated using the amount of bisphenol A listed in Table 2, with a total polymerization time of 1.5 hours, after which the compounds listed in Table 2 were added in the amounts shown and kneaded with the copolymerized [sic] polycarbonate, which was then formed into pellets.

The resulting copolymerized polycarbonate had an intrinsic viscosity (IV) of 0.42 dL/g. The results are listed in Table 2.

Comparison 8

The properties of a bisphenol A polycarbonate (High Flow Grade, from Nippon GE Plastics Ltd.) are listed in Table 2.

The following stabilizers were used, as indicated in Tables 1 and 2.

Irganox 168, from Ciba-Geigy

Mark AO-59, from Adeka-Argus

Cyasorb UV-5411, from Sun Chemical

TSF 437, from Toshiba Silicone

Plast Violet 8840, from Bayer

TABLE 2

|  | Example 6 | Example 7 | Comp. 7 | Comp. 8 |
|---|---|---|---|---|
| Bisphenol A/Resorcin (mole ratio in feed) | 85/15 | 90/10 | 100/0 | 100/0 |
| Acidic Compound Added (moles/mole alkali metal) | Butyl p-toluene-sulfonate 2 | Butyl p-toluene-sulfonate 2 | Butyl p-toluene-sulfonate 2 | — |
| Epoxy Compound Celloxide 2021P (Daicel) (g/100 g polymer) | 0.05 | 0.05 | 0.05 | — |
| Additives (g/100 g polymer) | | | | |
| Irganox 168 (Ciba-Geigy) | 0.05 | 0.05 | 0.05 | — |
| Mark A0-50 (Adeka-Argus) | 0.05 | 0.05 | 0.05 | — |
| Cyasorb UV-5411 (Sun Chem) | 0.3 | 0.3 | 0.3 | — |
| TSF 437 (Toshiba Silicone) | 0.3 | 0.3 | 0.3 | — |
| Plast Violet 8840 (Bayer) | 0.00006 | 0.00006 | 0.00006 | — |
| Initial Properties | | | | |
| Intrinsic Viscosity (dL/g) | 0.42 | 0.42 | 0.42 | 0.42 |
| MFR (g/10 min) | 37 | 32 | 27 | 27 |
| Color Tone (YI) | 0.6 | 0.6 | 0.6 | 0.6 |
| Light Transmission (%) | 89.7 | 89.7 | 89.7 | 89.7 |
| Haze | 0.3 | 0.3 | 0.3 | 0.3 |
| Holdup Stability | | | | |
| MFR (g/10 min) | 41 | 35 | 31 | 34 |
| MFR Increase (%) | 10 | 10 | 15 | 25 |
| Color Tone (YI) | 0.9 | 0.9 | 0.9 | 1.2 |
| Light Transmission (%) | 90.1 | 90.1 | 90.4 | 90.3 |
| Heat Resistance HDT (°C.) | 130 | 131 | 132 | 132 |
| Heat Aging Resistance Color Tone (YI) | 11 | 11 | 11 | 28 |
| Water Resistance Haze | 4 | 4 | 4 | 80 |

We claim:

1. A copolymerized polyester-polycarbonate consisting essentially of (a) units of the formula

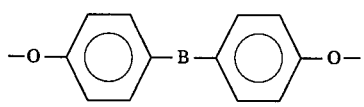

where B is

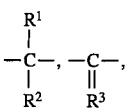

—O—, —S—, —SO— or —SO$_2$—, $R^1$ and $R^2$ are hydrogen atoms or monovalent hydrocarbyl groups, $R^3$ is a divalent hydrocarbylene group, and (b) units of the formula

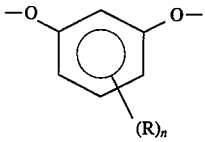

where each R is a $C_{1-10}$ hydrocarbyl group, a halogenated hydrocarbyl group, or a halogen atom and n is an integer from 0 to 4 provided that when n is 2 or more, the R groups are the same or different and (c) a group comprising units of the formula

wherein up to 50 mol % of the units (c) are derived from the group consisting of dicarboxylic acids, dicarboxylic acid esters, dicarboxylic acid halides or mixtures thereof whereby the copolymerized polyester-polycarbonate has an intrinsic viscosity of from 0.2 to 1.2 dL/g when measured at 20° C. in methylene chloride solution.

2. The copolymerized polyester polycarbonate of claim 1 wherein (b) units constitute from 2 to 40 mole percent of the copolymerized polycarbonate.

3. The copolymerized polyester polycarbonate of claim 1 wherein (b) units constitute from 2 to 30 mole percent of the copolymerized polycarbonate.

4. The copolymerized polyester polycarbonate of claim 1 wherein (b) units constitute from 2 to 25 mole percent of the copolymerized polycarbonate.

5. The copolymerized polyester polycarbonate of claim 1 wherein B in the formula for units (a) represents a group with the following formula:

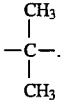

6. The copolymerized polyester polycarbonate of claim 1 wherein the intrinsic viscosity is from 0.3 to 1.0 dL/g.

* * * * *